March 13, 1956  A. N. IKNAYAN  2,737,969
RESILIENT SELF-SEALING AND SELF-LUBRICATING
VALVE FOR INFLATABLE ARTICLES
Filed April 16, 1952  2 Sheets-Sheet 1
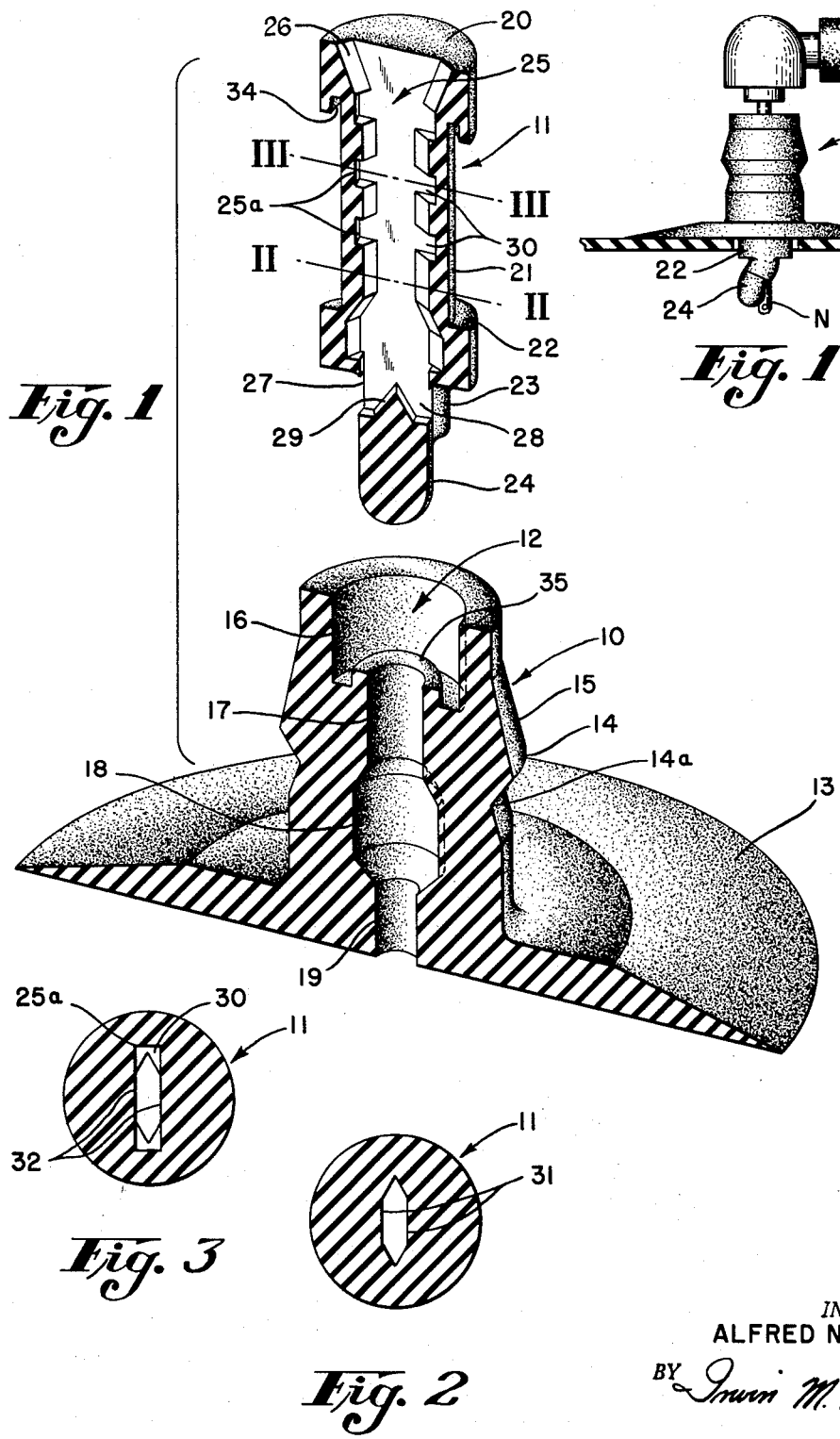
*INVENTOR.*
ALFRED N. IKNAYAN
BY *Irwin M. Lewis*
ATTORNEY.

March 13, 1956
A. N. IKNAYAN
2,737,969
RESILIENT SELF-SEALING AND SELF-LUBRICATING
VALVE FOR INFLATABLE ARTICLES
Filed April 16, 1952
2 Sheets-Sheet 2
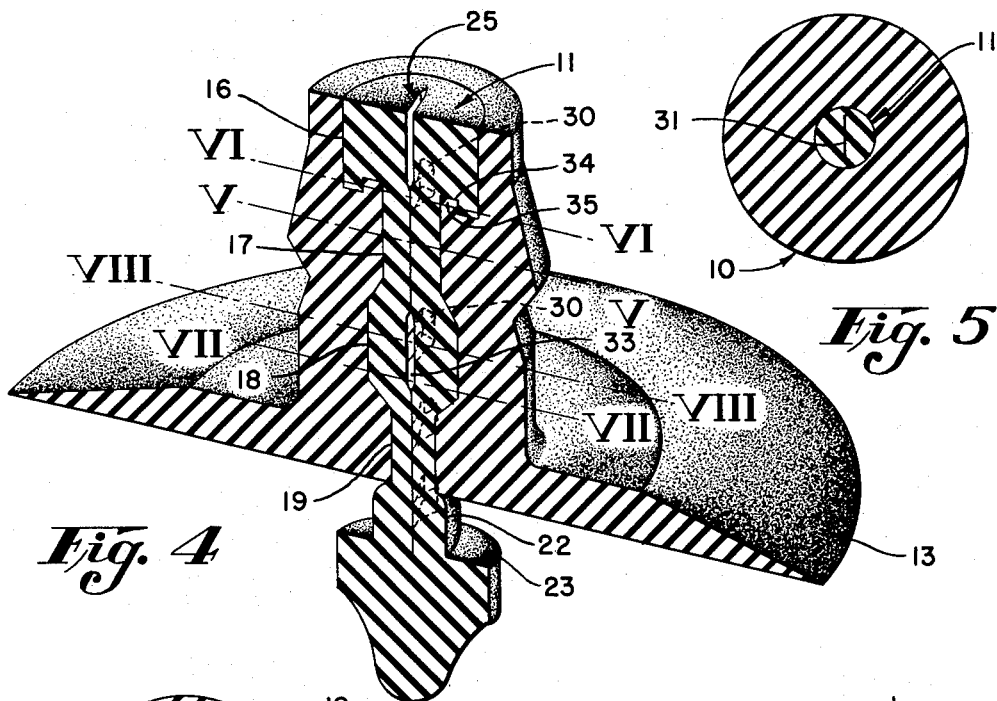
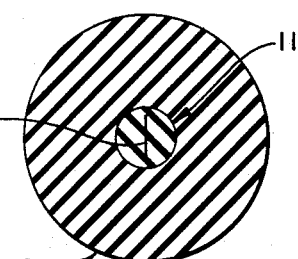
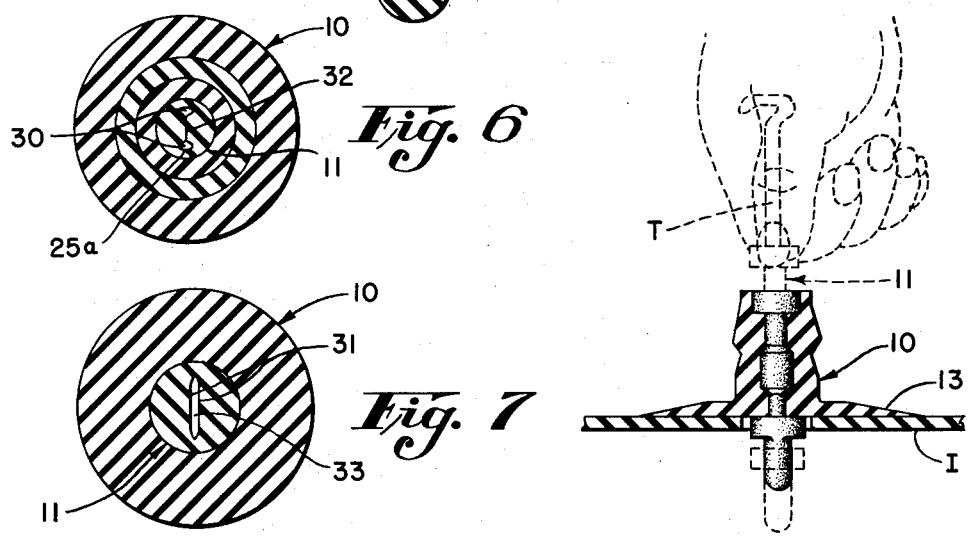
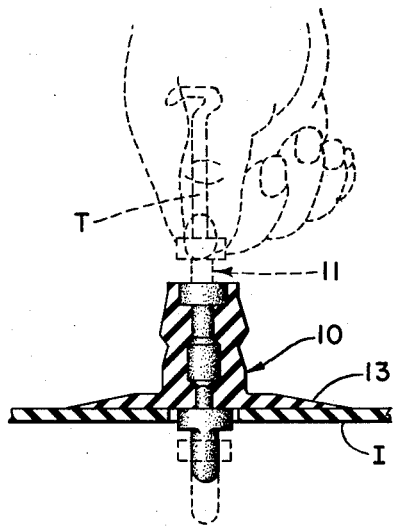
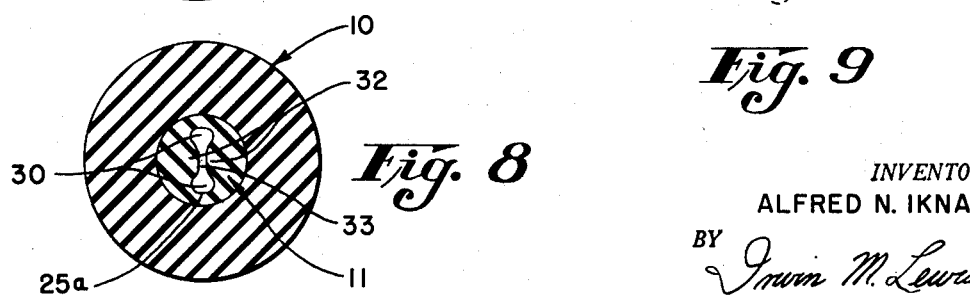
INVENTOR.
ALFRED N. IKNAYAN
BY
ATTORNEY.

United States Patent Office 2,737,969
Patented Mar. 13, 1956

2,737,969

RESILIENT SELF-SEALING AND SELF-LUBRICATING VALVE FOR INFLATABLE ARTICLES

Alfred N. Iknayan, Indianapolis, Ind., assignor to United States Rubber Company, New York, N. Y., a corporation of New Jersey Application April 16, 1952, Serial No. 282,653

6 Claims. (Cl. 137—223)

This invention relates to improvements in valves. In particular, it relates to improvement in valves of the type disclosed in U. S. Patent No. 2,318,115 which are used in conjunction with an elongated needle type inflating tool on inflatable articles such as pneumatic tires, footballs, basketballs and other inflatable devices.

In inflating articles having this type of valve, it is necessary to carefully lubricate the inflating needle before it is inserted into the valve. Failure to lubricate the needle results in early damage to the valve due to the friction between the needle and the walls of the inflating passage of the valve. This preliminary lubrication of the needle before insertion is not completely satisfactory as most of the lubricant is scraped from the needle as it is inserted into the small passage in the valve. It is one object of the present invention, therefore, to provide a valve so constructed that the valve itself will carry the lubricant and supply it to the needle as it is inserted in the valve. To this end, the passage in the valve is provided with glands or pockets in which the lubricant is held trapped so that it will be supplied to the needle as it is inserted in the valve.

Other objects and advantages of the invention will become apparent from the following description when read in conjunction with the accompanying drawing wherein:

Fig. 1 is an exploded sectional view of the valve of the invention showing the valve core and valve casing unassembled;

Fig. 2 is an enlarged sectional view taken on the line II—II of Fig. 1;

Fig. 3 is an enlarged sectional view taken on the line III—III of Fig. 1;

Fig. 4 is a sectional view showing the valve core and valve casing assembled;

Fig. 5 is a sectional view taken on the line V—V of Fig. 4;

Fig. 6 is a sectional view taken on the line VI—VI of Fig. 4;

Fig. 7 is a sectional view taken on the line VII—VII of Fig. 4;

Fig. 8 is a sectional view taken on the line VIII—VIII of Fig. 4;

Fig. 9 is a sectional view showing how the core is inserted in the valve casing; and Fig. 10 is an elevational view of the assembled valve showing the position of the needle type inflating tool relative to the valve preparatory to inflating an article.

Referring to the drawing and in particular to Fig. 1 of the drawing, the valve of the invention includes a valve casing 10 and a valve insert or core 11 which is adapted to be inserted into an axial passage 12 which extends through the casing 10. Both the valve casing and the insert are made of elastic rubber so that either may be stretched and deformed but will return to their original shape.

The valve casing 10 is generally cylindrical in shape and is provided with an enlarged circular base 13 so that it may be adhered to the exterior surface of an inflatable article such as an inner tube as shown at I in Figs. 9 and 10. The particular embodiment of the invention as shown in the drawing is for use on an inner tube and for this reason is provided with a circumferential rib 14 slightly larger in diameter than the valve stem opening in a conventional tire rim. The rib 14 is gradually tapered toward the body of the casing on its upper side as shown at 15 to facilitate insertion thereof through the usual valve stem opening in the tire rim. The rib 14 is compressed as it is inserted through the rim opening and expands radially after it has been completely inserted therethrough to prevent accidental withdrawal of the valve casing from the rim opening. A circumferential groove 14a is provided to accentuate the height of the rib 14 so as to render the rib more effective in locking the valve in the rim opening.

The core receiving passage 12 is made up of four distinct inter-connecting sections, namely, sections 16, 17, 18, and 19. The section 16 is cylindrical in cross-section and it is adapted to receive the enlarged head portion 20 of the insert or core 11. Section 16 communicates and is in axial alignment with cylindrical section 17 which is of a substantial length and of a diameter smaller than that of the outside diameter of the body portion 21 of the insert 11. Section 17 communicates and is in axial alignment with an enlarged section 18 which is of a diameter larger than section 17 but slightly less than the outside diameter of the body portion 21. Section 18 communicates and is in axial alignment with section 19 which is smaller in diameter than the outside diameter of the body portion 21 of the insert 11 and preferably smaller in diameter than the section 17. The functions of the sections 17, 18, 19 of the passage 12 will hereinafter be described in detail.

The core or insert 11 includes as previously described, an enlarged cylindrical head portion 20 and a smaller body portion 21. Immediately below the body portion 21 are two elliptical shaped retaining flanges 22 and 23 which extend at right angles to each other as partially shown in Fig. 1. As will later be brought out in detail, the flanges 22 and 23 assist in holding the core 11 in the passage 12. The core 11 terminates in a rounded tail section 24 which is slightly smaller in diameter than the body portion 21. The rounded end of this tail section facilitates insertion of the core 11 into the passage 12.

The core 11 is provided with a slit shaped inflating passage 25, hexagonal in cross-section, as shown in Fig. 2 into which a needle type inflating tool N as shown in Fig. 10 may be inserted. The passage 25 has a tapered opening 26 in the head 20 to facilitate insertion of the inflating needle N. The passage terminates in the tail section 24 spaced from the end thereof. The slit passage 25 at this point is of greater width than the diameter of the tail section 24 so that the slit passage 25 opens to the exterior on the opposite sides of the tail section 24 to provide openings 27 and 28 through which the inflating tool N may extend as shown in Fig. 10. The flange 23 provides additional reinforcement adjacent the openings 27 and 28 to prevent tearing in this region when the core is inserted or the inflating needle is inserted.

The bottom of the slit passage 25 is provided with a triangular portion 29 which serves to guide the end of the inflating needle toward either of the openings 27 or 28.

At spaced intervals the passage 25 is enlarged as at 25a by the provision of making the passage rectangular instead of hexagonal in cross-section as shown in Fig. 2. This provides spaced pockets or glands 30 along the wall of the passage 25 which as will hereafter be described in detail retain lubricant for the inflating needle.

As previously described, the body portion 21 of the insert 11 is of a larger diameter than sections 17, 18 and 19 of the passage 12 of the valve casing 10. In inserting the core or insert 11 in the passage 12, the core is reduced in cross-section by stretching it on a special tool T as shown in Fig. 9. In Fig. 9 the stretched core is shown in dashed lines. The tool and method of insertion are similar to that shown and described in U. S. Patent No. 2,318,115. When the stretching force is released after the core has been inserted in the passage 12, the core 11 contracts and in so doing expands radially. Complete contraction of the core is prevented by the head portion 20 and the flange 22, it being noted that the distance between the underside of the head 20 and the flange 22 is considerably shorter than the combined length of the sections 17, 18 and 19 so that the core 11 is maintained in a partially stretched condition in the valve casing 10. Flange 23 provides additional reinforcement for the flange 22 to render the flange 22 more rigid. The radial expansion of the core 11 upon partial contraction, forces the exterior walls of the core tightly against the interior walls of the sections 17 and 19 of the passage 12 of the valve casing 10 and the rubber of the core 11 is thereby placed under compression to tightly force the opposed walls 31 of the slit passage 25 coextensive with sections 17 and 19 tightly together as shown in Figs. 4 and 5 to form an airtight seal and thereby prevent leakage of air through the passage 25. The enlarged sections 25a provided by making the passage rectangular in cross-section, do not completely close though the opposed elongated walls 32 may be forced together intermediate their ends as shown in Fig. 6. The ends of these enlarged rectangular sections 25a do not close but form pockets 30 as shown in Fig. 6 which serve to store lubricant and supply the lubricant to the inflating needle as it is inserted in the inflating passage 25.

The enlarged section 18 of the passage 12 of the valve casing 11 provides space into which the core can retract and expand. The enlarged section also allows an intermediate portion of the insert 11 to expand radially to a greater extent than the extremities, so that an intermediate portion of the passage 25 of the core insert will not be closed completely but will remain partially open to provide a chamber or reservoir 33 for lubricant as shown in Figs. 4, 7 and 8. This function is provided with or without the provision of the enlarged rectangular sections 25a which form the pockets 30. It is to be also understood that the provision of the pockets 30 alone will function to retain lubricant without the provision of the enlarged section 18 but that the most effective strucure is the combination of the pockets 30 and the enlarged section 18. As can be seen by reference to Figs. 7 and 8, the chamber 33 is considerably larger at the points where the enlarged rectangular sections 25a are provided than where such sections are not provided, thereby insuring adequate space for retention of an ample supply of lubricant.

As previously described, the section 19 of the passage 12 is preferably smaller in diameter than the section 17. This insures greater sealing force adjacent the end of the passage 25 which is closest to the inflatable article.

In initially utilizing the valve structure after the core has been inserted, the pockets are filled with lubricant by partially inserting a needle type inflating tube into the passage and forcing lubricant therethrough into the passage. The lubricant so supplied will be trapped and retained in the pockets 30 and the chamber 33 and will be supplied to the needle as it is inserted in subsequent inflations of the article. When these pockets have been filled with the lubricant no special care need be taken in lubricating the needle, as the lubricant in the pockets will provide the necessary lubrication of the needle for many insertions. A suitable lubricant for this purpose is silicone grease.

In inflating an article having the valve of the type above described, the inflating tool is inserted in the passage 25 and extended through either opening 27 or 28 to the interior of the article as shown in Fig. 10. A suitable air hose such as shown at H in Fig. 10 is connected to the tool N and the article inflated. When the needle is withdrawn the slit passage 25 closes and prevents the air from leaking from the article. The lubricant is retained in the pockets 30 and chamber 33.

The head portion of the core 11 is provided with an undercut portion 34 which secures a rib 35 formed in the section 16 of the casing 10 as shown in Figs. 1 and 4. In removing the core 11, a tool with a hook-shaped end may be forced between the head 20 and the casing 10 and engaged in the undercut 34. Application of axial force to the tool will then pull the core 11 from the casing 10.

From the above description it can be seen there is provided an improved valve of the type used in conjunction with a needle type inflating tool. This improved valve is so constructed that it will carry and supply lubricant to the inflating needle as it is inserted in the valve, thereby eliminating the necessity of preliminary lubrication of the needle. The pockets 30 supply lubricant to the inflating needle throughout the length of the inflating passage 25 and the chamber 33 provides an additional reservoir for the lubricant.

It is to be understood that the above description and accompanying drawing are for the purpose of illustration only and not by way of limitation and changes and modifications may be made therein without departing from the spirit and the scope of the invention.

Having thus described my invention, what I claim and desire to protect by Letters Patent is:

1. A valve for inflatable articles comprising, a valve casing, an elastic core member, said valve casing having a passage therethrough of a diameter less than the normal diameter of said core when the core is in an unstretched condition, said core having an inflating passage therethrough into which an inflating needle can be inserted, said core member being adapted to be stretched to reduce the diameter thereof so that it may be inserted in said passage in said valve casing, and expanded radially by contraction longitudinally after it is inserted so that it will seal itself against the wall of the passage in said valve casing and will retain the inflating passage closed to prevent escape of gas therethrough, said passage in said valve casing having an enlarged section intermediate the ends thereof of a cross-sectional area sufficient to allow an intermediate portion of said core member to expand to an extent that an intermediate section of said inflating passage through said core member remains open to provide a chamber for retaining lubricant for the inflating needle.

2. A valve having an elastic core, said core having a passage therethrough into which an inflating needle can be inserted, said passage being substantially hexagonal in cross-section with two opposed parallel sides being considerably longer than the other sides and closely spaced whereby said passage will readily close under pressure, spaced sections of said passage being rectangular in cross-section with two parallel sides considerably longer than the other sides and closely spaced whereby said longer sides will be forced together intermediate their length under pressure but will remain spaced apart at the ends so that pockets are formed which will retain a lubricant for lubricating the inflating needle.

3. A valve of the type utilized with a needle type inflating tool comprising, an elastic core member having a passage extending therethrough adapted to receive an inflating needle, said passage being substantially hexagonal in cross section with two opposed parallel sides being considerably longer than the other sides and closely spaced whereby said passage will readily close under pressure, spaced sections of said passage being rectangular in cross section with two parallel sides considerably longer than the other sides and closely spaced whereby said longer sides will be forced together intermediate their length under pressure but will remain spaced apart at their ends so that pockets are formed which will retain a lubricant for lubricating the inflating needle, a casing for said core, a passage through said casing, the exterior diameter of said core in an unstretched condition being larger than the diameter of said passage through said casing, said elastic core member being adapted to be stretched longitudinally to reduce the diameter thereof so that it may be inserted in said passage in said casing and expanded radially by contraction longitudinally into contact with the wall of the passage when the stretching force is released to thereby close the passage through the core to prevent gas from leaking therethrough.

4. A valve for inflatable articles comprising, a valve casing, an elastic core member, said valve casing having a passage therethrough of a diameter less than the normal diameter of said core when said core is in an unstretched condition, said core having an inflating passage therethrough into which an inflating needle can be inserted, said inflating passage being substantially hexagonal in cross section with two opposed parallel sides being considerably longer than the other sides and closely spaced whereby said passage will readily close under pressure, spaced sections of said passage being rectangular in cross section with two parallel sides considerably longer than the other sides and closely spaced whereby said longer sides will be forced together intermediate their length under pressure but will remain spaced apart at the ends so that pockets are formed which will retain a lubricant for lubricating the inflating needle, said core member being adapted to be stretched to reduce the diameter thereof so that it may be inserted in said passage in said valve casing and expanded radially by contraction longitudinally after it is inserted so that it will seal itself against the wall of the passage in said valve casing and will retain the inflating passage closed to prevent escape of gas therethrough, said passage in said valve casing having an enlarged section intermediate the extremities of the passage into which portions of said core member may expand whereby an intermediate section of said inflating passage will remain open to provide a chamber, said chamber and said pockets serving to retain lubricant for the inflating needle.

5. A valve having an elastic core, said core having a passage therethrough, said passage being of substantially slit shape in cross-section and having two closely spaced comparatively long opposed sides, said opposed sides of sections of said passage being connected together at their lateral extremities to form comparatively sharp lateral edges so that said sections will readily close under pressure to form a fluid tight seal across the full width of said passage, the opposed sides of other sections of said passage being spaced apart a substantial distance at their lateral extremities whereby the opposed sides of said other sections will be forced together under pressure intermediate their lateral extremities but will remain spaced apart at their lateral extremities whereby isolated pockets will be formed at said lateral extremities of said opposed sides of said other sections which will retain a lubricant for lubricating an inflating needle inserted through said passage.

6. A valve for inflatable articles comprising, a valve casing, an elastic core member, said valve casing having passage therethrough of a diameter less than the normal diameter of said core when said core is in unstretched condition, said core member being adapted to be stretched longitudinally to reduce the diameter thereof so that it may be inserted in said passage in said valve casing and expanded radially by longitudinal contraction after it is inserted so that it will seal itself against the wall of the passage in said valve casing and will be compressed radially, said core having an inflating passage therethrough, said inflating passage being of substantially slit shape in cross-section and having two closely spaced comparatively long opposed sidewalls, said opposed sidewalls of sections of said inflating passage being connected together at their lateral extremities to form comparatively sharp lateral edges so that said sections will readily close under said radial compression to form a fluid tight seal across the full width of said passage, the opposed sidewalls of other sections of said passage being spaced apart a substantial distance at their lateral extremities so that the opposed sidewalls of said other sections will be forced together intermediate their lateral extremities by said radial compression but will remain spaced apart at their lateral extremities so that isolated pockets are formed at said lateral extremities of said opposed sidewalls of said other sections, said passage in said valve casing having an enlarged section intermediate its ends of a cross-sectional area sufficient to allow an intermediate portion of said core member to expand radially to an extent that an intermediate section of said inflating passage through said core member remains open to provide a chamber, said chamber and said pocket serving to retain lubricant for an inflating needle.

References Cited in the file of this patent

UNITED STATES PATENTS

| | | |
|---|---|---|
| 2,073,766 | Suzuki | Mar. 16, 1937 |
| 2,183,900 | Voit et al. | Dec. 19, 1939 |
| 2,233,096 | Goldsmith | Feb. 25, 1941 |
| 2,318,115 | Tubbs | May 4, 1943 |
| 2,634,785 | Tubbs | Apr. 14, 1953 |